US010318671B2

United States Patent
(12) United States Patent
Schmedlen

(10) Patent No.: US 10,318,671 B2
(45) Date of Patent: Jun. 11, 2019

(54) PREDICTING SOCIAL, ECONOMIC AND LEARNING OUTCOMES

(71) Applicant: HEWLETT-PACKARD DEVELOPMENT COMPANY, L.P., Houston, TX (US)

(72) Inventor: Michael John Schmedlen, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 270 days.

(21) Appl. No.: 15/306,553

(22) PCT Filed: May 28, 2014

(86) PCT No.: PCT/US2014/039723
§ 371 (c)(1),
(2) Date: Oct. 25, 2016

(87) PCT Pub. No.: WO2015/183255
PCT Pub. Date: Dec. 3, 2015

(65) Prior Publication Data

US 2017/0046459 A1 Feb. 16, 2017

(51) Int. Cl.

| | |
|---|---|
| ***G06F 17/50*** | (2006.01) |
| ***G06Q 50/20*** | (2012.01) |
| ***G06Q 10/04*** | (2012.01) |
| ***G06Q 10/06*** | (2012.01) |
| ***G06F 17/18*** | (2006.01) |
| ***G09B 5/00*** | (2006.01) |

(Continued)

(52) U.S. Cl.
CPC .......... *G06F 17/5009* (2013.01); *G06F 17/18* (2013.01); *G06Q 10/04* (2013.01); *G06Q 10/06* (2013.01); *G06Q 10/0637* (2013.01); *G06Q 10/06375* (2013.01); *G06Q 50/20* (2013.01); *G06Q 50/205* (2013.01); *G09B 5/00* (2013.01); *G09B 19/00* (2013.01); *G09B 19/0061* (2013.01); *G09B 19/18* (2013.01); *G06F 2217/16* (2013.01)

(58) Field of Classification Search
USPC ............................ 703/2; 709/217; 705/14.66
See application file for complete search history.

(56) References Cited

U.S. PATENT DOCUMENTS

2002/0178017 A1 11/2002 Stevens et al.
2007/0106753 A1 * 5/2007 Moore ............... G06F 17/3089 709/217

(Continued)

FOREIGN PATENT DOCUMENTS

KR 10-2008-0017735 2/2008

OTHER PUBLICATIONS

Noeth; "Evaluating the Effectiveness of Technology in Our Schools", < http://www.act.org/research/policymakers/pdf/school_tech.pdf >, Feb. 9, 2004.

(Continued)

*Primary Examiner* — Thai Q Phan
(74) *Attorney, Agent, or Firm* — Robert C. Sismilich

(57) ABSTRACT

One example includes predicting social, economic, and learning outcomes for a geographic entity at a future time. The outcomes are predicted using near-real-time student data indicators and correlations between the indicators and the outcomes.

15 Claims, 15 Drawing Sheets

(51) Int. Cl.

| | |
|---|---|
| ***G09B 19/00*** | (2006.01) |
| ***G09B 19/18*** | (2006.01) |
| *G06F 13/00* | (2006.01) |

(56) References Cited

U.S. PATENT DOCUMENTS

| | | | | |
|---|---|---|---|---|
| 2008/0077461 | A1 | 3/2008 | Glick | |
| 2008/0227077 | A1 | 9/2008 | Thrall et al. | |
| 2009/0281821 | A1 | 11/2009 | Yaskin | |
| 2010/0323336 | A1 | 12/2010 | Guimaraes | |
| 2012/0244504 | A1* | 9/2012 | Wasserman ............ | G09B 19/00 434/238 |
| 2013/0096892 | A1 | 4/2013 | Essa | |
| 2013/0109003 | A1 | 5/2013 | Lee | |
| 2013/0110737 | A1 | 5/2013 | Shustorovich et al. | |
| 2015/0006295 | A1* | 1/2015 | Liu ........................ | G06Q 50/01 705/14.66 |

OTHER PUBLICATIONS

McEwan; "Cost-effectiveness Analysis of Education and Health Interventions in Developing Countries", Dec. 2011.

"Economic Analysis of Education Interventions", http://web.worldbank.org/1N4JVNYBRO, Jun. 24, 2006.

* cited by examiner

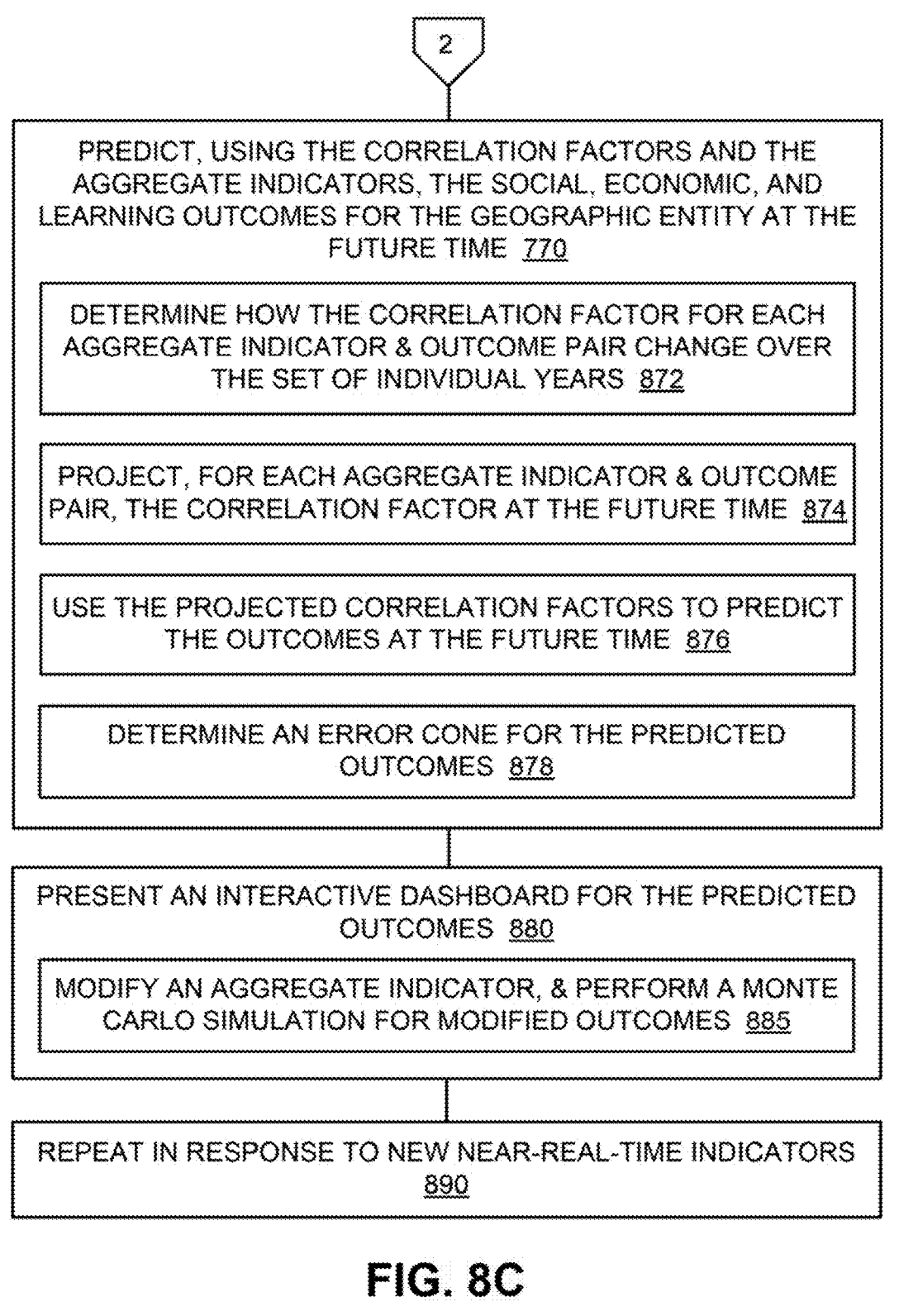

2

PREDICT, USING THE CORRELATION FACTORS AND THE AGGREGATE INDICATORS, THE SOCIAL, ECONOMIC, AND LEARNING OUTCOMES FOR THE GEOGRAPHIC ENTITY AT THE FUTURE TIME 770

DETERMINE HOW THE CORRELATION FACTOR FOR EACH AGGREGATE INDICATOR & OUTCOME PAIR CHANGE OVER THE SET OF INDIVIDUAL YEARS 872

PROJECT, FOR EACH AGGREGATE INDICATOR & OUTCOME PAIR, THE CORRELATION FACTOR AT THE FUTURE TIME 874

USE THE PROJECTED CORRELATION FACTORS TO PREDICT THE OUTCOMES AT THE FUTURE TIME 876

DETERMINE AN ERROR CONE FOR THE PREDICTED OUTCOMES 878

PRESENT AN INTERACTIVE DASHBOARD FOR THE PREDICTED OUTCOMES 880

MODIFY AN AGGREGATE INDICATOR, & PERFORM A MONTE CARLO SIMULATION FOR MODIFIED OUTCOMES 885

REPEAT IN RESPONSE TO NEW NEAR-REAL-TIME INDICATORS 890

FIG. 8C

| EXPORT FROM LITERACY ASSESSMENT \| APP EXPORT | | | | |
|---|---|---|---|---|
| STUDENT COHORT | PASS | FAIL | | |
| 1 | 432 | 394 | n | 11392 |
| 2 | 456 | 501 | pass | 5870 |
| 3 | 732 | 221 | fail | 5522 |
| 4 | 452 | 564 | % pass | 0.515274 |
| 5 | 112 | 643 | | |
| 6 | 488 | 449 | | |
| 7 | 511 | 514 | | |
| 8 | 609 | 358 | | |
| 9 | 515 | 435 | | |
| 10 | 500 | 488 | | |
| 11 | 532 | 451 | | |
| 12 | 531 | 504 | | |
| | | | | |
| TOTAL | 5870 | 5522 | | |

FIG. 9A

| | GDP/CAP | LITERACY |
|---|---|---|
| YEAR | NY.GDP.PCAP.KD | SE.ADT.1524.LT.ZS |
| 1990 | 399.53 | 58.74 |
| 1991 | 390.93 | 59.43 |
| 1992 | 386.68 | 63.30 |
| 1993 | 392.70 | 64.32 |
| 1994 | 395.67 | 64.54 |
| 1995 | 405.32 | 67.65 |
| 1996 | 421.04 | 68.68 |
| 1997 | 433.34 | 67.45 |
| 1998 | 459.12 | 68.49 |
| 1999 | 472.43 | 70.02 |
| 2000 | 485.64 | 71.40 |
| 2001 | 501.24 | 71.43 |
| 2002 | 500.43 | 70.50 |
| 2003 | 505.54 | 74.20 |
| 2004 | 506.50 | 73.40 |
| 2005 | 515.34 | 76.32 |
| 2006 | 516.65 | 78.05 |
| 2007 | 518.48 | 78.43 |
| 2008 | 525.43 | 78.88 |
| 2009 | 525.32 | 80.08 |
| 2010 | 530.71 | 79.98 |

| YEAR | GDP/CAP |
|---|---|
| 1999 | 472.43 |
| 2000 | 485.64 |
| 2001 | 501.24 |
| 2002 | 500.43 |
| 2003 | 505.54 |
| 2004 | 506.50 |
| 2005 | 515.34 |
| 2006 | 516.65 |
| 2007 | 518.48 |
| 2008 | 525.43 |
| 2009 | 525.32 |
| 2010 | 530.71 |
| 2011 | 538.19 |
| 2012 | 542.73 |
| 2013 | 547.28 |
| 2014 | 551.82 |
| 2015 | 556.37 |
| 2016 | 560.91 |
| 2017 | 565.46 |
| 2018 | 570.00 |
| 2019 | 574.55 |
| 2020 | 579.09 |

PREDICTING SOCIAL, ECONOMIC AND LEARNING OUTCOMES

BACKGROUND

Geographic entities (such as, for example, nations or states) often set goals for achieving certain economic social, and learning outcomes by a future point in time. In many cases, these outcomes are related to the educational performance of students in their schools. Schools have the ability to influence the educational performance of students by interventions or treatments in the educational system, such as for example by the adoption of particular technology, tools, techniques, and policies. The goal of these interventions is to improve the desired outcomes.

BRIEF DESCRIPTION OF THE DRAWINGS

FIGS. 8A-8C are flowcharts in accordance with an example of the present disclosure of another method for predicting social, economic, and learning outcomes for a geographic entity at a future time.

FIGS. 9A-D are an example of the operation of the method of FIGS. 7 and 8A-B, or the server of FIGS. 1-2, for predicting two outcomes for a geographic entity at a future time using one database, in accordance with an example of the present disclosure.

DETAILED DESCRIPTION

Figure 1:
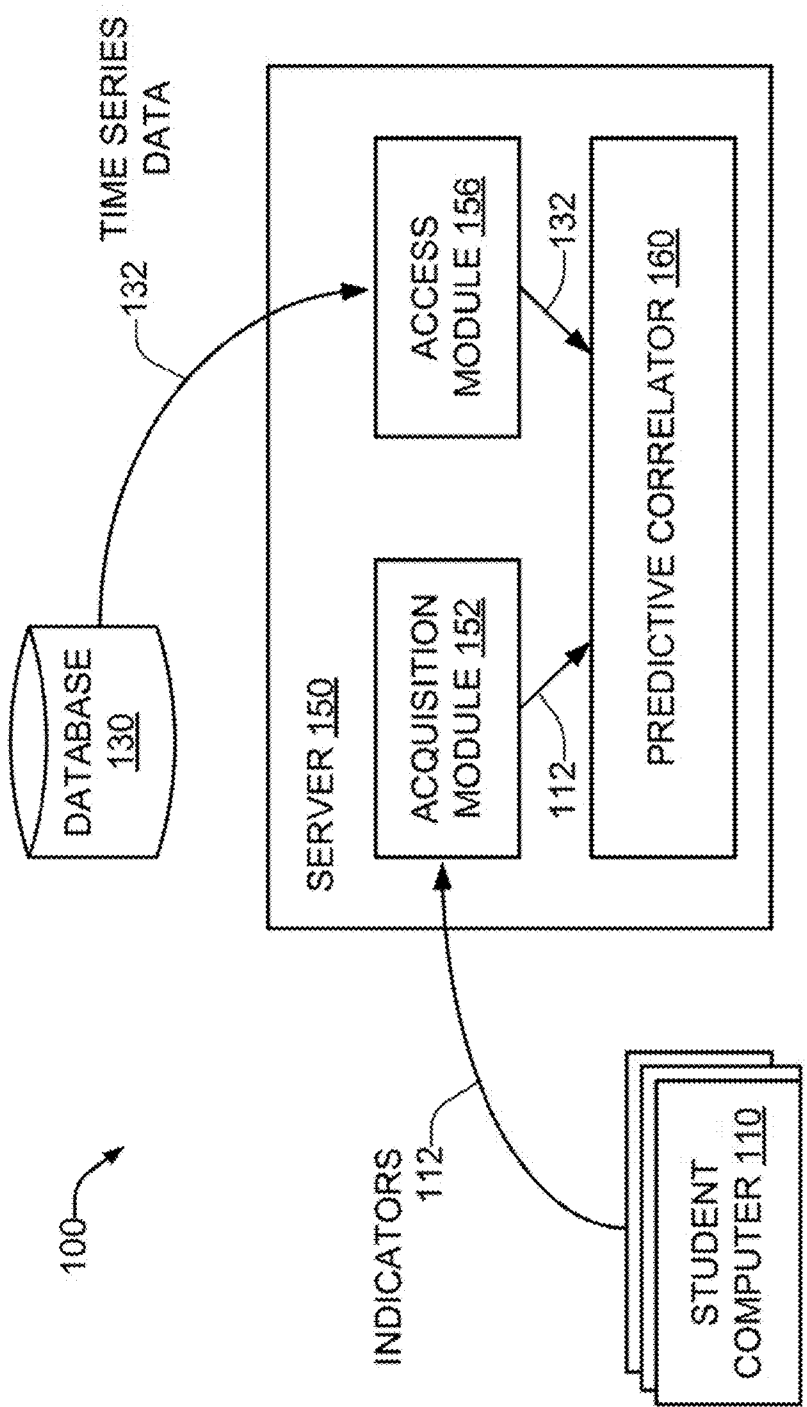
FIG. 1 is a block diagram of system including a server to predict social, economic, and learning outcomes for a geographic entity at a future time, in accordance with an example of the present disclosure.

Geographic entities face challenges in measuring and projecting the impact and the effectiveness of educational system interventions in achieving the economic, social, and learning outcomes they have established. One challenge is identifying the impact of a particular intervention on a particular desired outcome. Another challenge is evaluating the impact and effectiveness up to the moment, "right now"; often the evaluations are performed using lagging data that reflect conditions months or even years earlier and thus may be outdated by the time they are received. A further challenge, particularly for geographic entities which encompass a large number of students in their educational system, is that the data may be sampled such it is collected for just a fraction of the students, rather than for every student. Yet another challenge is not just measuring the current progress towards desired outcomes, but also predicting what the outcomes will be at a future time. And, if the predicted outcomes at the future time fall short of the entity's goals, then an additional challenge is determining what data-driven actionable guidance (e.g. recommendations of further interventions based on the data used to generate the predicted outcomes) could be made in order to put the entity back on track to achieve the desired outcomes. If these proposed interventions involve a substantial financial commitment on the part of the entity, it is desirable to know with a certain degree of confidence whether the interventions will achieve the desired outcomes.

The present disclosure overcomes these challenges by predicting social, economic, and learning outcomes for a geographic entity at a future time based on current student data indicators for the geographic entity and preexisting time series outcome data for similar geographic entities across three scales; regional peer entities (those with borders adjacent to the target geography); categorical peer entities (those with similar demographic, ethnographic and economic characteristics); and global peer entities (all geographic entities on Earth with available data). The indicator data is not from a sampling of students, but rather data from every student in the geographic entity is utilized in the predictions. This overcomes inaccuracies that can often occur with sampling. All indicators are correlated with all outcomes to determine both expected and unexpected relationships between the indicators and the outcomes.

As defined herein and in the appended claims, a "student data indicator" may be broadly understood to mean data that is gathered about an individual student. This data may take a broad range of forms, including demography (e.g. age, gender, ethnicity), attendance, behavior, participation in sports, participation in school activities, and academic performance (e.g. formative assessments, test scores, subject grades, grade-point average), among many others. Some of the data may be stored in educational databases such as those in learning management systems (LMS), student information systems (SIS), or similar systems. Other data may be collected automatically from a computer, such as a notebook or a tablet, which is assigned to and associated with a particular student. This computer may be carried and used by the student both at school and away from it, such as when the student is at home. This computer-sourced data includes configuration information indicative of applications installed on the computer, mobility information indicative of the geolocation of the computer over time, and usage information indicative of student interactivity with the computer, including the applications and the internet.

The types of student data indicators described to this point are considered to be "live" student data indicators, in that they reflect current information about the student. In addition, those live student data indicators which are collected automatically from the student computers are considered to be "near-real-time" indicators. As defined herein and in the appended claims, a "near-real-time" indicator may be broadly understood to mean a student data indicator that is "pushed" from a source upon its generation (e.g. at a student computer) at the source, or its receipt (e.g. in an LMS or SIS) at the source. Where the source is connected to the network, the near-real-time data is sent from the source within a time range of about 50 ms to 120 seconds. However, when the indicator is generated at a time when the source is not connected to the network, such data indicators may not be sent by the source until the connection is made, and thus can take a longer time to be pushed from the source. For example, when the student is at home, the student computer may not be within range to make a wireless (e.g. Wi-Fi) connection to the network. A student computer may be connected to the network when it comes within the communication range of the network; when the computer crosses a geofenced threshold; or when the connection is activated by a near-field communication protocol such as Bluetooth. Accordingly, the indicators will be sent by the source within about 50 ms to 120 seconds of the computer connecting to the network. The term "near-real-time" is understood to encompass such delays due to lack of connectivity of a student computer. Furthermore, in some situations the data may be sent by the source within this time range, but not received by its intended destination within this time range. This can occur, for example, where the end-to-end bandwidth of the system is limited, such as in geographic entities having poor connectivity like slow connections, unavailable network links, etc. In this case, the data may not be received by the analyzer within the time range, but may be delayed by up to several hours or even longer. The term near-real-time is understood to encompass receipt times at the intended destination that are outside the window due to limited end-to-end bandwidth.

By using "live" student data indicators, and in many cases "near-real-time" student data indicators, the associated predictions reflect the state of the educational system of the geographic entity "right now", based on up-to-date, current information about all the students of the geographic entity. If such predictions were to be attempted based on manually-collected data, by the time the predictions were made the data would be months, if not years, out of date. This becomes even more significant as the number of students increase, such as for example where the geographic entity encompasses an entire nation. If the student data indicators were taken from just a sampling of students in an attempt to reduce the volume of indicators, accuracy could be compromised. Or if some indicators and some outcomes were not correlated with each other in an attempt to reduce complexity, effort, or time, drivers of outcomes might well be missed.

As defined herein and in the appended claims, an "aggregate indicator" may be broadly understood to mean an indicator which represents data about a set of students. In some examples, an aggregate student data indicator is formed from a set of individual student data indicators. For example, the aggregate indicator may be the mean or median of the set of individual indicators. In one example, the set of students may correspond to all the students of the particular geographic entity. In another example, the set of students may correspond to the students participating in a specific educational intervention. In some examples, the aggregate indicators result from student data provided in near-real-time, while in other examples at least some aggregate student data indicators for a geographic entity may be provided from national or state summative assessments. Summative assessments include national, provincial or other standardized tests. Summative assessments are not necessarily associated with student computers of the geographic entity, and/or are not provided in near-real-time. These latter aggregate indicators may be considered to be "lagging" (rather than "live") indicators, which reflect past information about the students of the entity.

As defined herein and in the appended claims, "time series" data may be broadly understood to mean one or more datasets of the same parameters over a period of time. In some examples, the parameters relate aggregate indicators to social, economic, and/or learning outcomes in multiple years. The time series data is for peer entities of the geographic entity which is associated with the student data indicators. The time series data thus represents the historical performance of the peer entities.

As defined herein and in the appended claims, an "outcome" may be broadly understood to mean an effect that may be mathematically correlatable to an aggregate indicator, a set of aggregate indicators, an intervention, or a set of interventions. An intervention is an action, procedure or method meant to improve a specific skill or set of skills in students. An outcome may be an economic, a social, or a learning outcome. An economic outcome is a measure of a geographic entity's economy. Example economic outcomes include gross domestic product (GDP) per capita, unemployment rate, or the percent of students who emigrate after receiving a specified level of education. A social outcome is a measure of social conditions in a geographic entity. Example social outcomes include the crime rate per capita, the crime rate by level of education, the ratio of girls to boys participating in the education system, the voting rate, or the broadband access rate. A learning outcome is a measure of a geographic entity's educational progress. Example learning outcomes include formative and summative performance assessments in math, science, or language. A "rate" may be expressed as a percentage of the population of the geographic entity having the characteristic. Additional learning outcomes can include graduation and promotion rates for primary, secondary and tertiary education, career readiness (as defined by the geographic entity), and mastery of ICT (information, communications & technology) topics.

As defined herein and in the appended claims, a "predicted outcome" may be broadly understood to mean an outcome that is predicted or projected to exist at a specified future point in time.

As defined herein and in the appended claims, a "geographic entity" may be broadly understood to mean an entity associated with a corresponding geographic area. In some examples, a geographic entity may be a geopolitical one such as a nation, a state, a county, a city, or another type of geopolitical subdivision. In some examples, a geographic entity may be an geoeducational one such as a school system, a school district, an individual school, or an individual class in a school. In some examples, a geographic entity may be both geopolitical and geoeducational, such as a school system for an entire nation, a school district for a particular county, etc.

Referring now to the drawings, there is illustrated an example of a system which predicts social, economic, and learning outcomes for a geographic entity at a future time based on current student data indicators for the geographic entity and preexisting time series outcome data for peer entities. Data indicators for individual students are received and aggregated, and correlation factors between each aggregate indicator and each outcome are calculated. The correlation factors and the aggregate indicators are then used to predict the outcomes at the future time. The predicted effect on outcomes of potential interventions that affect one or more aggregate indicators can be explored in order to provide guidance for improvement of the outcomes.

Considering now one example system to predict social, economic, and learning outcomes for a geographic entity at a future time, and with reference to FIG. 1, a system 100 includes plural student computers 110 that supply near-real-time student data indicators 112, a database 130 having time series data 132 which relates the student data indicators 112 in aggregated form to social, economic, and learning outcomes for a set of peer entities, and a server 150. The server 150 includes an acquisition module 152 that is structured to receive the near-real-time student data indicators 112 from the plural student computers 110. The server 150 also includes an access module 156 that is structured to obtain the time series data 132 from the database 130. The server 150 further includes a predicative correlator 160 coupled to the acquisition module 160 and the access module 170. The predicative correlator 160 is structured to aggregate the indicators for the plurality of students. The predicative correlator 160 is also structured to correlate each aggregate indicator with each social, economic, and learning outcome. The predicative correlator 160 is further structured to predict the social, economic, and learning outcomes for the particular geographic entity at the future time based upon the aggregate indicators and the correlations. The server 150 may be implemented in hardware, software, or a combination of hardware and software. Where implemented at least partly in software, the server 150 includes a computer-readable storage medium on which computer-executable instructions are stored, and a processor coupled to the medium that executes the instructions.

Figure 2:
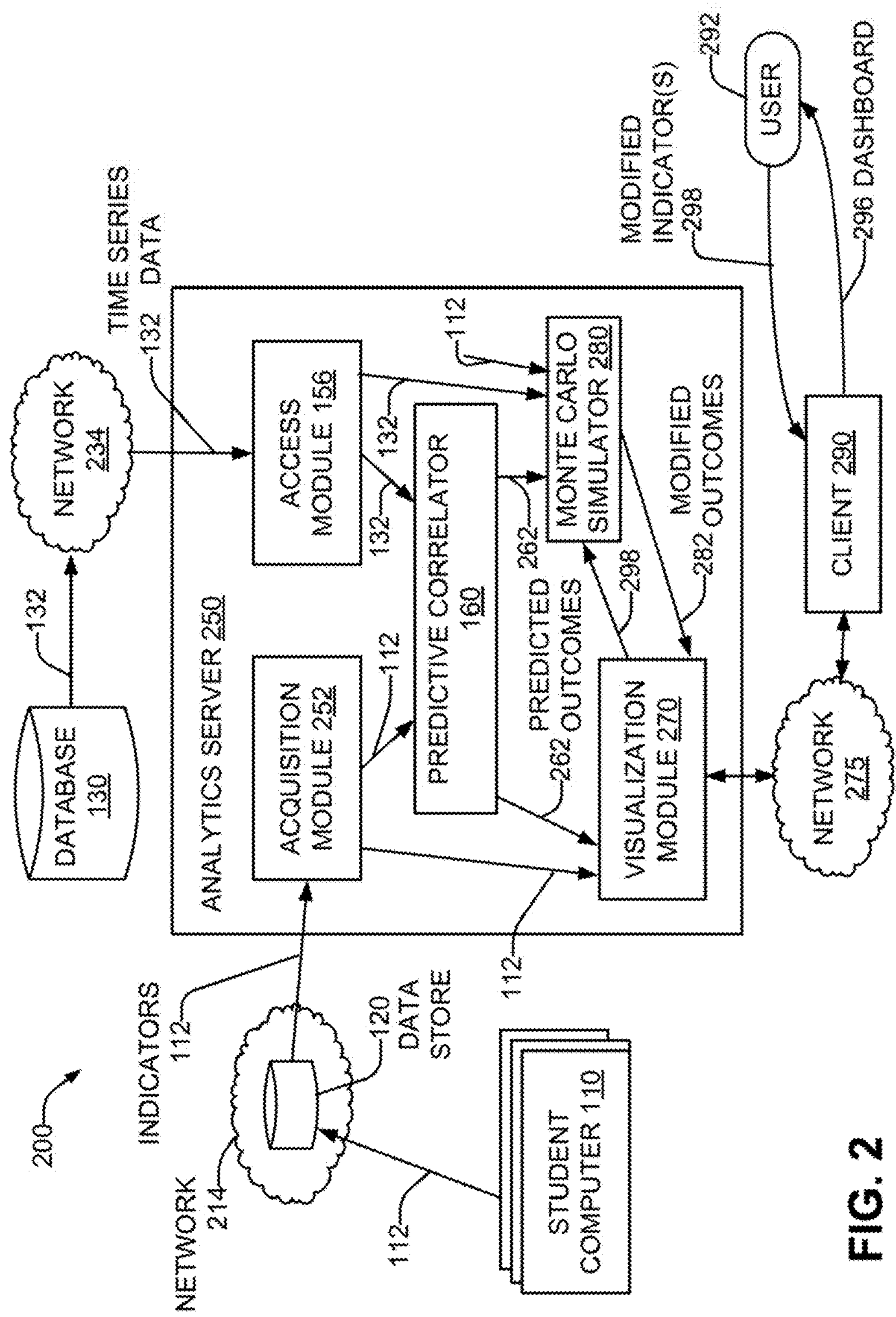
FIG. 2 is a block diagram of another system including a server to predict social, economic, and learning outcomes for a geographic entity at a future time, in accordance with an example of the present disclosure.

Considering now another example system to predict social, economic, and learning outcomes for a geographic entity at a future time, and with reference to FIG. 2, a system 200 includes an analytics server 250. The student computers 110 and the database 130 may be coupled to the server 250 via networks 214, 234 respectively. As such, the server 250 may be either local to, or remote from, the computers 110 and the database 130. The networks 214, 234 may be the Internet or other types of networks.

The near-real-time student data indicators 112 may be pushed or uploaded from the student computers 110 to a data store 120 on the network 114. The data store 120, in turn, provides the indicators 112 to the acquisition module 252 of the server 250. The data store 120 is discussed subsequently in greater detail with reference to FIG. 3.

The analytics server 250 includes a visualization module 270. The visualization module 270 receives predicted social, economic, and learning outcomes 262 from the predictive correlator 160 and presents at least some of the outcomes 262 to a client computer 290 for display to a user 292. The server 250 and the client computer 290 may be coupled via network 275, which may be the Internet or another type of network. (In some examples, two or more of networks 214, 234, and 275 may be the same network.) The client computer 290 may be a desktop computer, a notebook or laptop computer, a personal digital assistant (PDA), a mobile phone, or any other type of computer. A web browser, or an application ("app"), on the client computer 290 interacts with the visualization module 270, which may function as a server for the browser or app. The browser or app of the client computer 290 displays an interactive dashboard 296 to the user 292. The dashboard 296, discussed subsequently in greater detail with reference to FIGS. 5 and 6A-6B, displays the predicted outcomes 262 in numeric, graphical, or other form. The user 292 or an administrator (not shown) can configure which of the outcomes 262 are displayed on the dashboard 296.

The server 250 also includes a monte carlo simulator 280, coupled to the predictive correlator 160 and the visualization module 270, that allows the user 292 to explore "what-if" scenarios. These scenarios involve simulating changes to one or more aggregate indicators, and evaluating the impact of these changes on the predicted outcomes. The user 292 provides the modified aggregate indicator(s) 298 to the monte carlo simulator 280 by interacting with the dashboard 296 of the client computer 290, which communicates the modified aggregate indicator(s) 298 to the monte carlo simulator 280 via the visualization module 270 server. The monte carlo simulator 280 also receives the indicators 112, the time series data 132, and the predicted outcomes 262. Using these inputs, the monte carlo simulator 280 then performs the simulation scenarios, which are run a large enough number of times (e.g. 1000 to 50,000 times) so as to obtain statistically sound results. The monte carlo simulator 280 then generates modified outcomes 282 and provides them to the visualization module 270, which in turn provides them to the client 290 for display on the dashboard 296.

As previously described, student computers 110 generate new or updated indicators 112 asynchronously from the operation of the analytics server 250. When a computer 110 is connected to the network 114, these indicators 112 are communicated to the data store 120, and thence to the acquisition module 252 of server 250, in near-real-time. The acquisition module 252 provides the indicators 112 to the visualization module 270 as well as to the correlator 160. The visualization module 270 then causes the dashboard 296 to be updated to reflect the effect of the latest indicators 112 to the user 292 in near-real-time. Two sets of visualizations may be presented to the geographic entities. The first set is a near real-time summary of the entity's performance on one or more given indicators. The second set is a prediction of future learning, economic and/or social outcome based on the near real-time performance of the given indicators.

Figure 3:
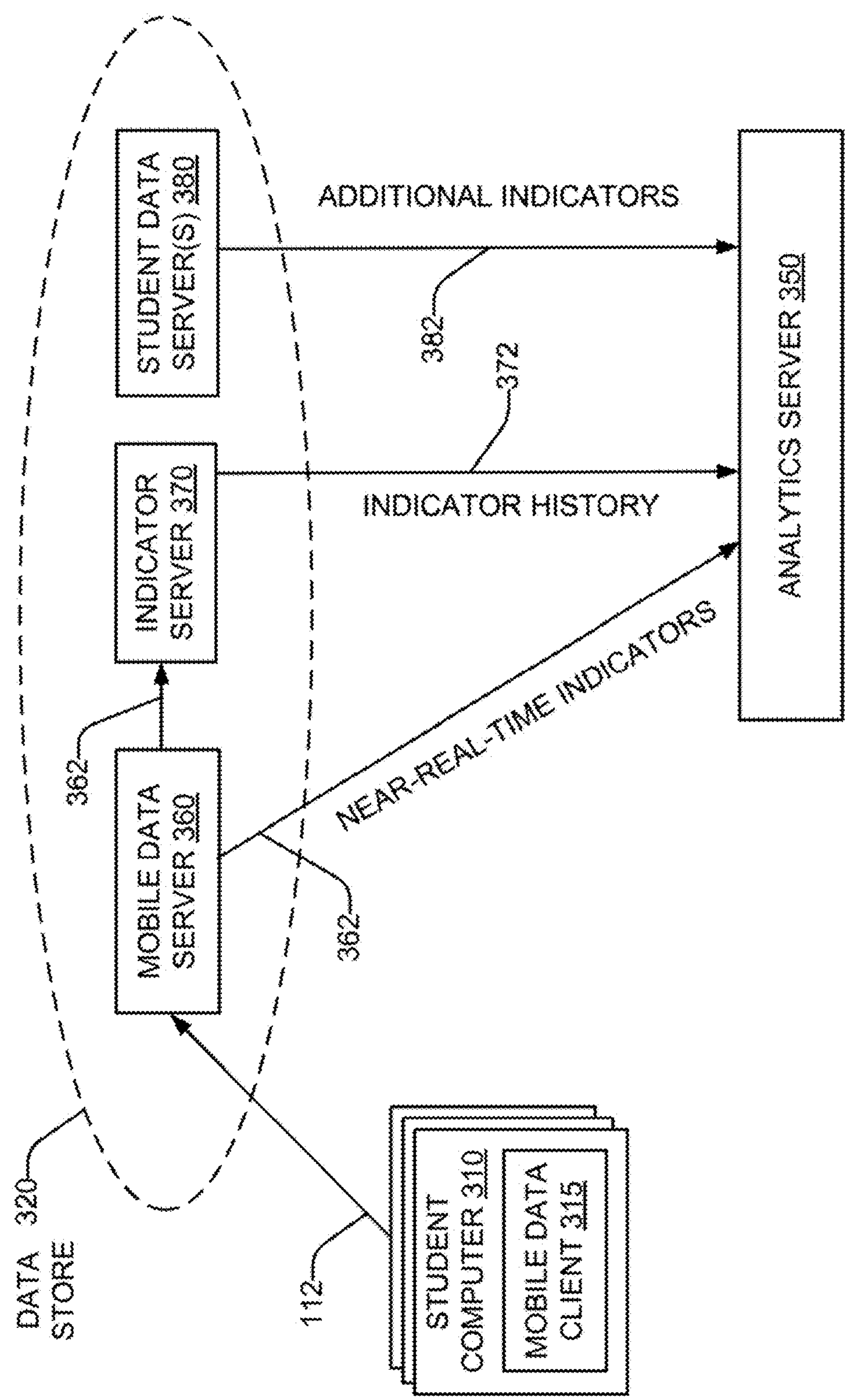
FIG. 3 is a lower-level block diagram of a data store of the system of FIG. 2, in accordance with an example of the present disclosure.

Considering now in greater detail the data store 120, and with reference to FIG. 3, in one example a data store 320 includes one or more servers. The servers are coupled to an analytics server 350, which may be the analytics server 150 (FIG. 1) or 250 (FIG. 2).

One server of the data store 120 may be a mobile data management server 360. Each student computer 310 includes a mobile data management client 315 that is configured to access the mobile data management server 360 and to automatically provide student data indicators 112 to the mobile data management server 360 in near-real-time. In one example the mobile data management client 315 may be implemented as firmware that runs automatically on a student computer 310, and which provides one or more indicators 112 to the mobile data management server 360 periodically, when a change in an indicator, or the generation of an indicator, occurs. The indicators 112 may be provided at other times consistent with near-real-time operation.

The indicators 112 provided by the mobile data management client 315 may include configuration information, mobility information, and usage information. Configuration information may include, for example, installed applications, applications accessed, applications added and deleted, and product data, among other types. Example applications may include Brain pop, Dreambox, and numerous similar apps. Mobility information may include, for example, the geolocation of the computer over time, such as when the student takes in to and from school, the time the student takes to travel to and from school, the geolocation of the computer during school hours (to indicate attendance), among other types. Usage information may include, for example, information indicative of student interactivity with the computer, including the time spent by the student interacting with an application; data which is output or exported from the application regarding student performance and progress during practice, remediation, and other exercises;

and the degree of acceptability/unacceptability of the application to the student, among other types.

The mobile data server 360, in turn, may provide (i.e. push or upload) current indicators received from the student computers 310 to the analytics server 350 in near-real-time as indicators 362. These indicators 362 may be used by the visualization module 270 to update the dashboard 296 (FIG. 2) in near-real-time. In some examples, the current indicators may be aggregated by the acquisition module 252, by the visualization module 270, or by another module of the analytics server 250, and the aggregated indicators displayed on the dashboard 296.

In some examples, the mobile data server 360 may send the current indicators 362 to an indicator server 370 which stores them as a time series or history. The indicator server 370 may provide some or all of the historical indicators to the analytics server 350 as indicator history 372. The indicator history 372 may be used by the predictive correlator 160 of analytics server 350 to generate the predicted outcomes.

The data store 320 may also include one or more additional student data servers 380. The servers 380 may include learning management systems (LMS), student information systems (315), or similar systems. Student information systems may provide student data indicators for demography, attendance, behavior, and participation in sports and school activities. Learning management systems may provide student data indicators for academic performance, such as formative assessments (e.g. those with a quantitative grade and ration or rank score), test scores, subject grades, grade-point averages, summative (e.g. year-end) assessments, and the like. Where the preceding types of student data indicators are provided or pushed from the student data servers 380 to the analytics server 350 when received, they are considered "live" student data indicators. A student data server 380 may also provide "lagging" student data indicators resulting from national or state summative assessments for the geographic entity to the analytics server 350. The lagging indicators may be provided in aggregated, rather than individual, form. Collectively the servers 380 provide additional student data indicators 382 to the analytics server 350.

In some examples, on or more of the servers 360, 370, 380 may be separate physical servers, while in other examples two or more may be the same physical server. The various servers 350, 360, 370, 380 may be local or remote to each other on the network 214 (FIG. 2).

Figure 4:
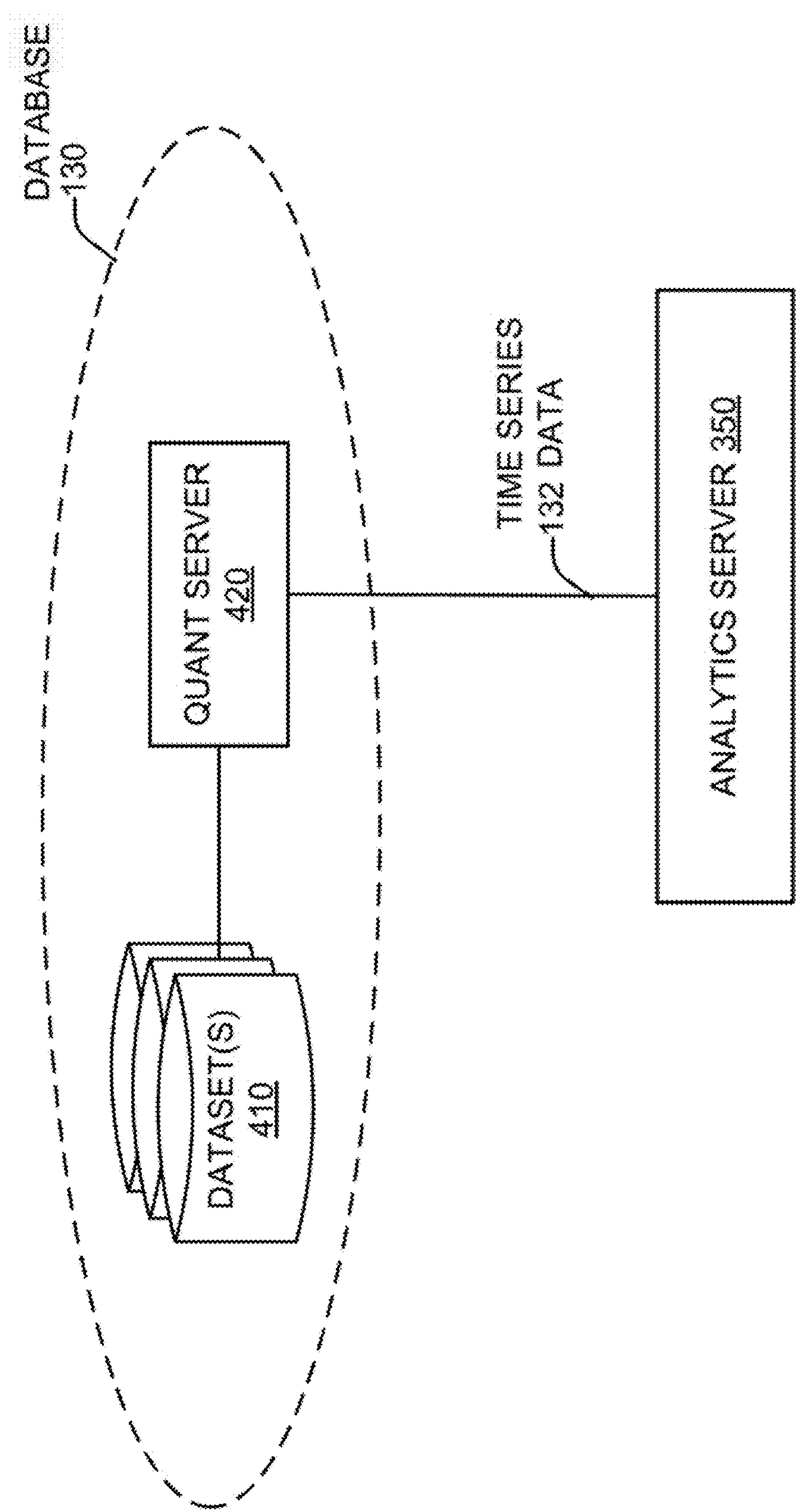
FIG. 4 is a lower-level block diagram of a database of the system of FIG. 1 or 2, in accordance with an example of the present disclosure.

Considering now in greater detail the database 130, and with reference to FIG. 4, in one example the database 130 includes one or more datasets 410. The datasets 410 may be accessed by a quant server 420. The quant server 420 is coupled to the analytics server 350 (FIG. 3) and provides the time series data 132 (FIGS. 1-2) to the analytics server 350.

At least some of the datasets 410 are third-party economic, social, and educational (i.e. learning) datasets which are internationally comparable. An internationally comparable dataset includes generally-accepted measures of learning, economic and/or social performance (outcomes) which are segmented per geographic entity, but also comparable in aggregate measures. The third parties providing the datasets 410 may include one or more of the World Bank, UNESCO, UNICEF, the World Economic Forum, the Organization of Economic Cooperation & Development (OECD), or the International Educational Assessment organization (IEA). The datasets 410 may include one or more of the World Bank's World Development Indicators (WDI) dataset; the PISA and other datasets from OECD; the TIMMS and PIRLS datasets from IEA; education gender equity data from UNICEF; the Global Competitiveness Index from the World Economic Forum; and others. The WDI dataset provides current, accurate global development information. The PISA, TIMMS, and PIRLS datasets provide information about student reading, math, and science achievement. These datasets 410 are updated periodically, for example annually, and by accessing the data for various periods the historical time series data 132 can be provided.

While the quant server 420 is illustrated as being coupled to all datasets 410, in other examples multiple quant servers 420 may be used. As an example, a certain dataset 410 may be accessed through the server of the organization that provides the dataset.

Figure 5:
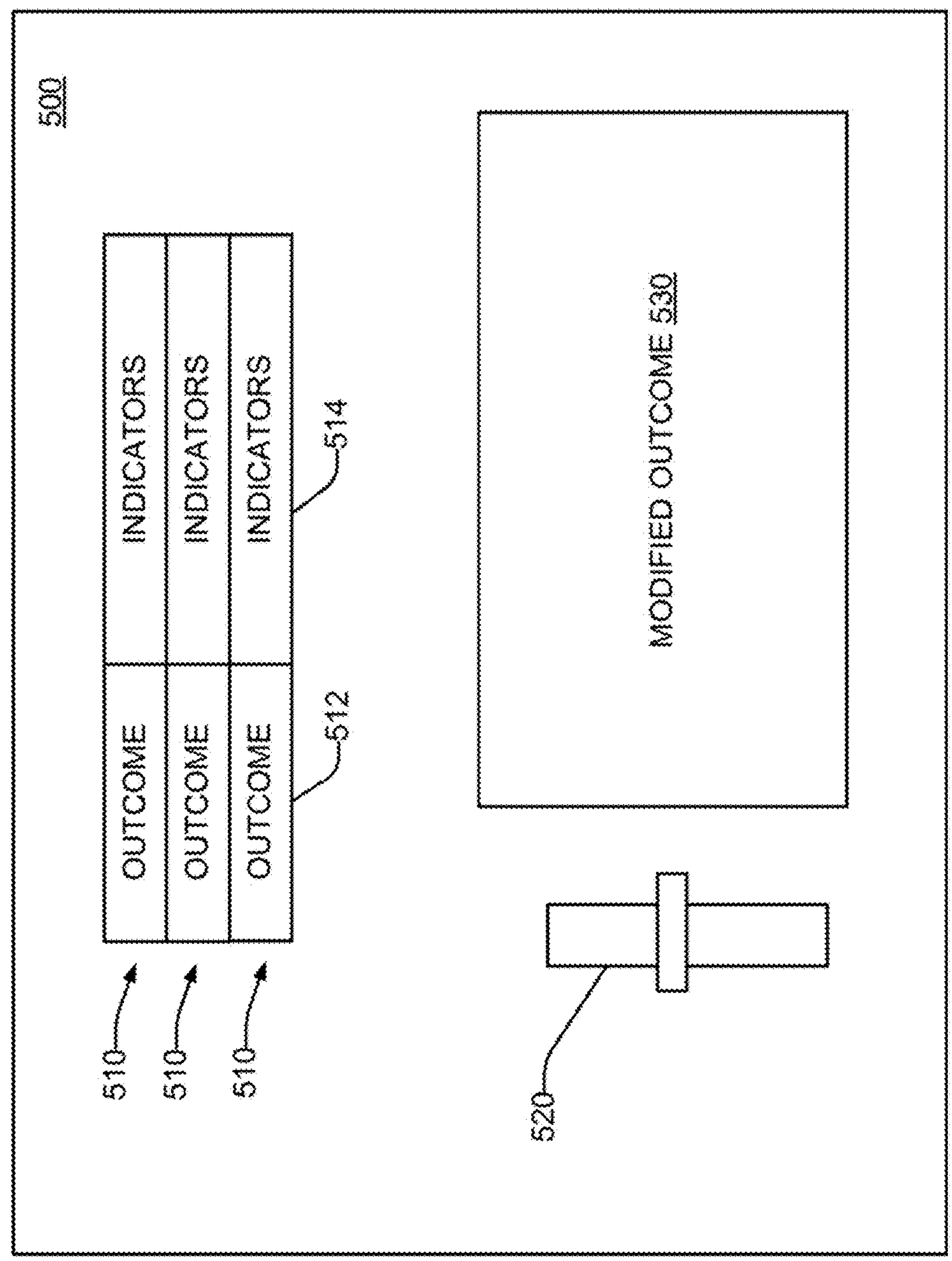
FIG. 5 is a schematic representation of a dashboard displayable by a computer for predicted social, economic, and learning outcomes for a particular geographic entity at a future time, in accordance with an example of the present disclosure.
Figure 6A:
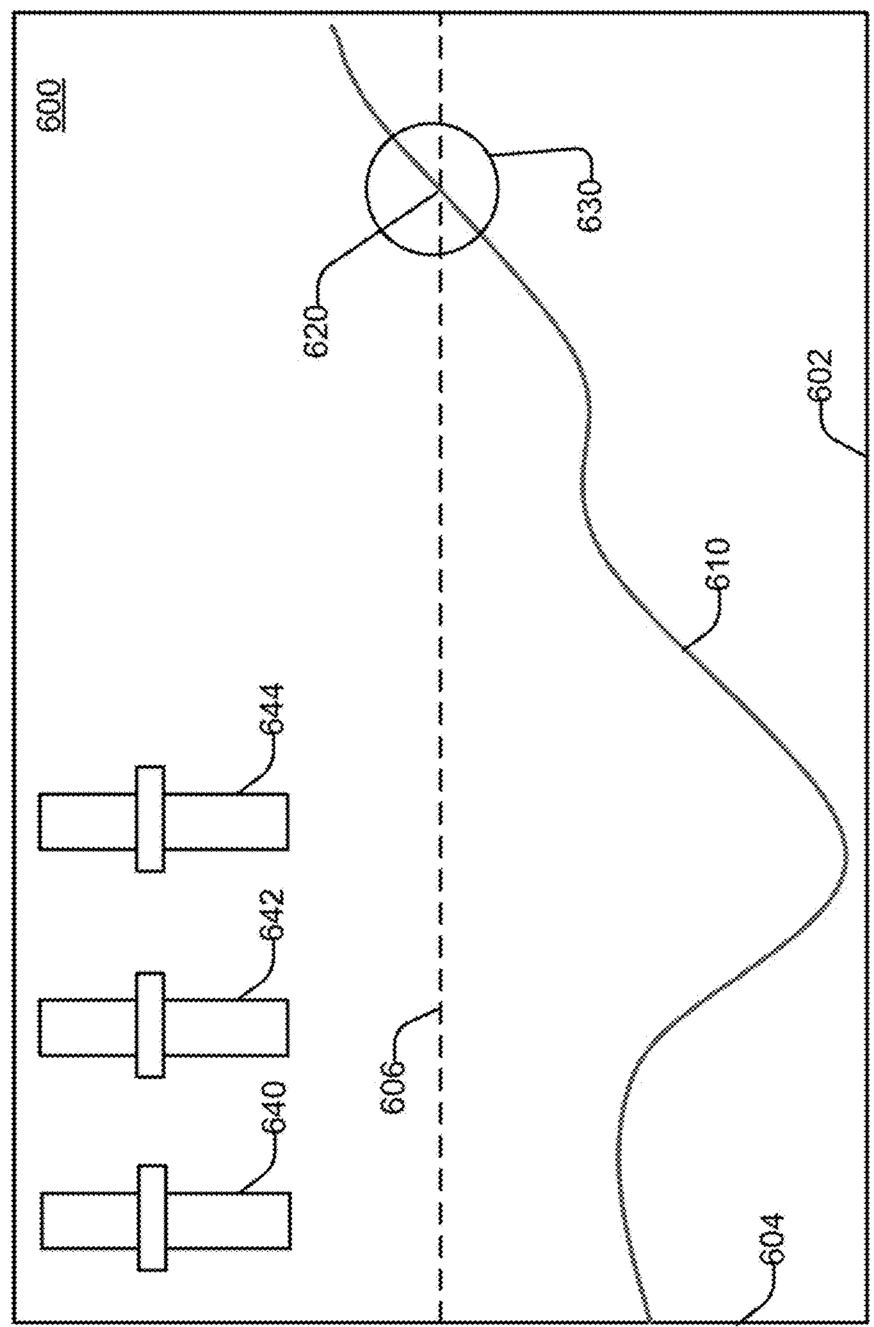
FIGS. 6A-6B are schematic representations of a graphical display of outcomes usable with the dashboard of FIG. 5, in accordance with an example of the present disclosure.
Figure 6B:
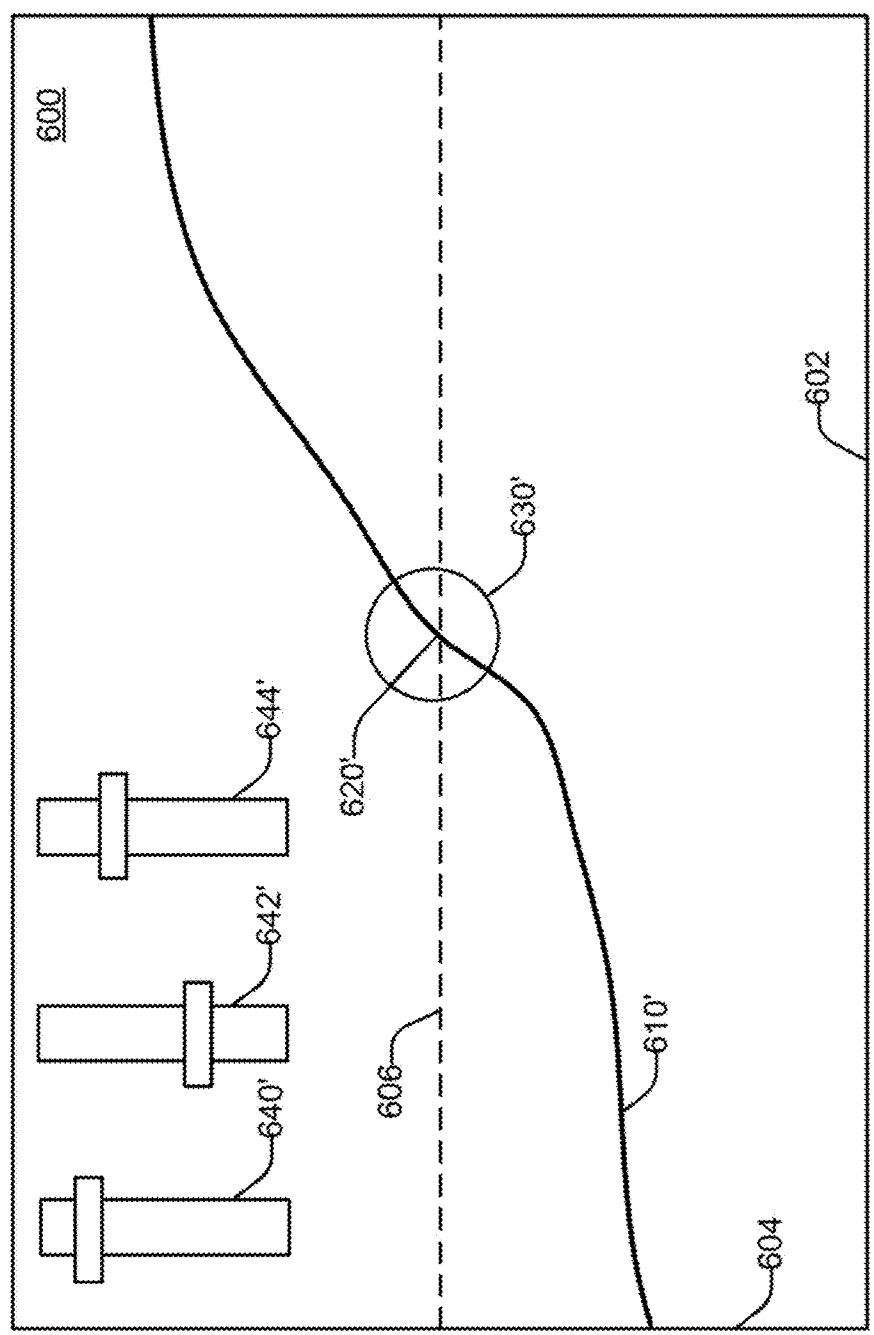

Considering now one example of the dashboard 296, and with reference to FIGS. 5 and 6A-6B, a user interface dashboard 500 displayable by a computer, such as for example client computer 290, may include a plurality of outcome components 510, at least one control component 510, and at least one modified outcome component 530.

Each outcome component 510 displays a predicted social, economic, or learning outcome 512 for a particular geographic entity at a future time. In some examples, each outcome components 510 also displays one or more student data indicators 514 that have a significant correlation to the outcome 512. Each outcome 512 may be determined from near-real-time student data indicators, and from time series data for a set of other geographic entities that relates the indicators 514 in aggregated form to the outcomes 512. The correlation and the outcome 512 may be determined by the predictive correlator 160 (FIGS. 1-2).

Each outcome component 510 may display the associated outcome in numeric, textual, graphical, or other form. In some examples, the graphical form may be the graph 600 of FIG. 6A, discussed subsequently.

Each control component 520 is structured to allow a user to modify an aggregate indicator which corresponds to the control component 520. In one form, the control component 520 may be represented as a "slider" with which the user can interact to adjust the value of the corresponding aggregate indicator up or down.

Each modified outcome component 530 displays a social, economic, or learning outcome at the future time as modified responsive to user input to the at least one control component 520. As with an outcome component 510, each modified outcome component 530 may display the associated outcome in numeric, textual, or graphical form. The modified outcome is generated by monte carlo simulation scenarios that use the aggregate indicator(s) as modified by the control component 520.

The dashboard may be generated in near-real-time as new or updated student data indicators are received at the analytics server 250. A currently displayed dashboard may updated in near-real-time as new or updated student data indicators are received at the analytics server 250. In this way, the user 292 (FIG. 2) has a "live" view of the status and progress of the geographic entity towards its goals for economic, social, and learning outcomes based on current student data indicators.

Considering now a graphical display of the outcome component 510 or the modified outcome component 530, and with reference to FIG. 6A, an outcome component 600 includes a two-dimensional graph. In some examples, the graph includes a time dimension along one axis 602, and an outcome value along a second axis 604, with the outcome value plotted over time as a line 610 having a particular shape and position. A target value of (i.e. a goal for) the outcome is illustrated at 606. A point in time 620 may indicate the time when the outcome is predicted to achieve its target value. An error cone 630 reflecting the uncertainty in time and outcome value may surround the point 620. The error cone 630 may include a statistical error associated with the prediction. The origin of the time axis may represent the current date, such that the entire line 610 represents predictions of the outcome at a future time. In other examples, the line 610 may represent a combination of the actual historical outcome values up to the present date, and the predicted outcome into the future. In other words, the current date is positioned somewhere along the axis 602 to the right of its origin.

Where the component 600 is a modified outcome component 530, at least one control component associated with the display may be superimposed on the component 600. The component 600 as illustrated Includes three example control components 640, 642, 644 corresponding to three aggregate student data indicators that are correlated to the value of the outcome. In other examples, fewer or more control components may be presented for a single outcome component 600. In the case where a dashboard includes plural outcome components, the same control components may be associated with some or all of the plural outcome components, or an individual outcome component may have its own set of control components.

In an initial display the control components 640, 642, 644 may be shown with the crossbar of the slider in a central position. In the central position, each control component represents the actual current value of the aggregate indicator that corresponds to the control component. The actual current value may also be displayed numerically on the outcome component 600, although that is omitted from FIGS. 6A-6B for simplicity of illustration.

The user may modify one or more of the control components 640, 642, 644 in order to observe the predicted effect on the outcome of modifying the indicator. By doing so, the user can simulate the effect of the aggregate indicator change on the predicted outcome at the future time via the monte carlo simulator 280 (FIG. 2). This advantageously allows the user to run "what-if" scenarios that predict what would happen to the outcome if the value of the aggregate indicator could be changed in this manner through interventions or treatments. By manipulating the various control components 640, 642, 644, the user can determine what changes in aggregate indicators might allow the predicted outcome to achieve the target value at an earlier time, for example. Once the user knows the optimal changes in the aggregate indicators associated with the control components 640, 642, 644, the user can then focus on developing the interventions or treatments that can achieve these improvements in aggregate indicators.

Considering now the simulated modification of the aggregate indicators, and with reference to FIG. 6B, the control components 640', 642', 644' represent modified values of aggregate indicators for purposes of the simulation, as indicated by the raised or lowered position of their crossbars. In response, the shape and position of the line 610' is different from that of the line 610 in FIG. 6A. The point in time 620' is to the left of the point in time 620 (FIG. 6A), indicating that the desired outcome is predicted to be achieved at an earlier future time based on the modified aggregate indicators rather than if the aggregate indicators were unmodified. The shape of the line 610', not just its position, can be different from the line 610 due to interactions that occur between the aggregate indicator modifications and which are accounted for by the monte carlo simulator 280.

Figure 7:
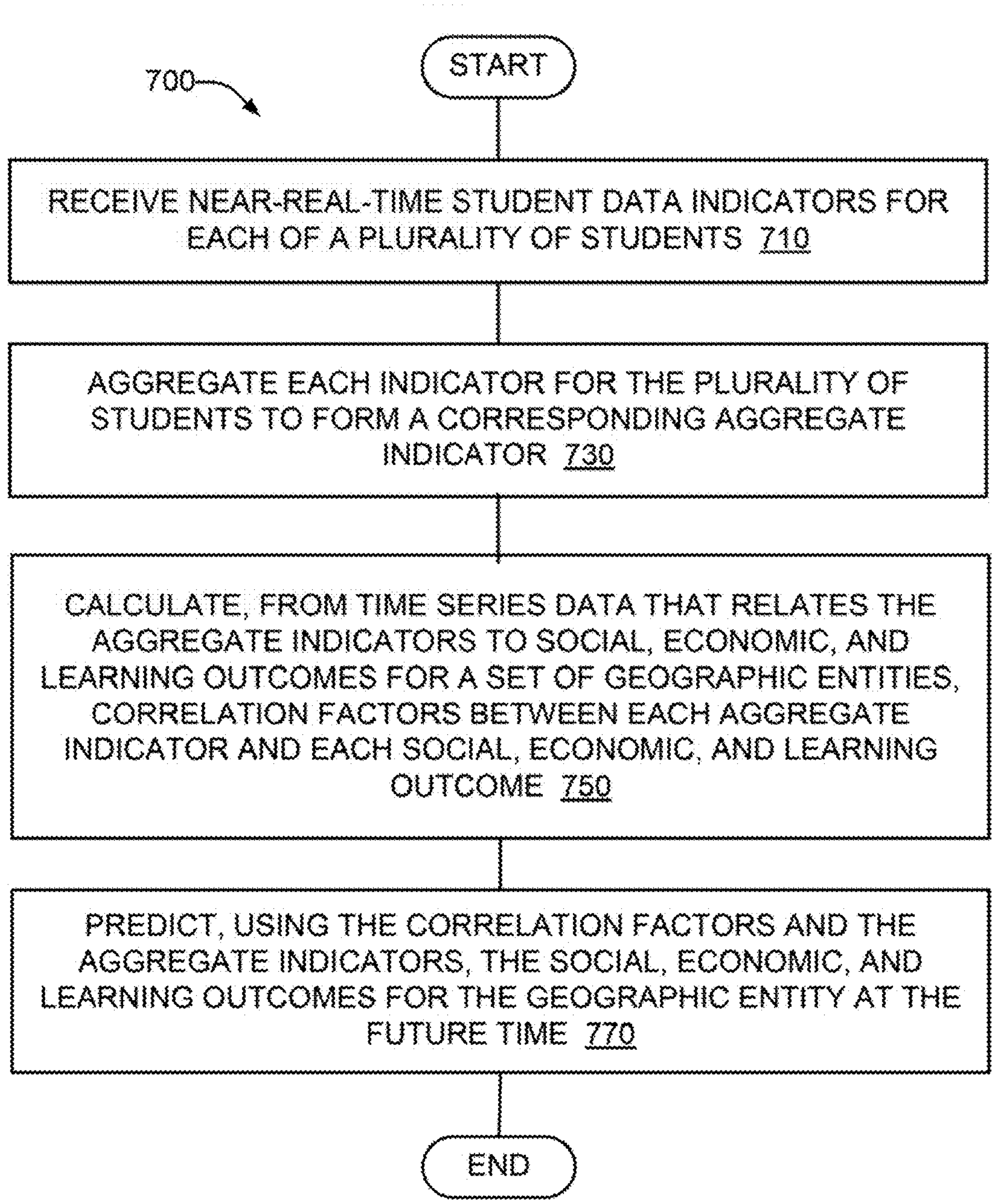
FIG. 7 is a flowchart in accordance with an example of the present disclosure of a method for predicting social, economic, and learning outcomes for a geographic entity at a future time.

Considering now one method for predicting social, economic, and learning outcomes for a geographic entity at a future time, and with further reference to FIG. 7, an example method 700 begins at 710 by receiving near-real-time student data indicators for each of a plurality of students. At 730, each indicator for the plurality of students is aggregated to form a corresponding aggregate indicator. At 750, correlation factors between each aggregate indicator and each social, economic, and learning outcome are calculated from time series that that relates the aggregate indicators to the social, economic, and learning outcomes for a set of geographic entities. At 770, the social, economic, and learning outcome outcomes for the geographic entity at the future time.

Figure 8A:
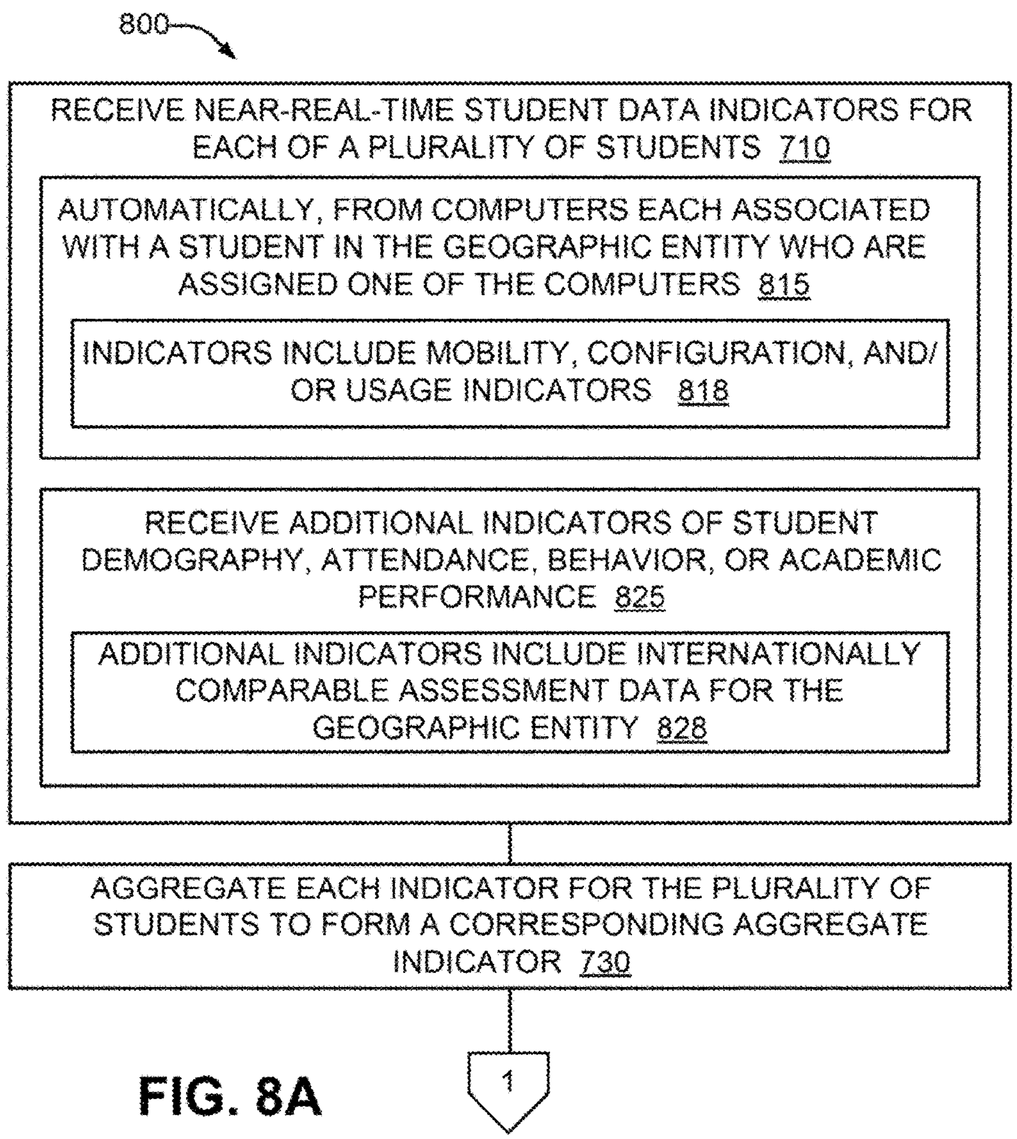
Figure 8B:
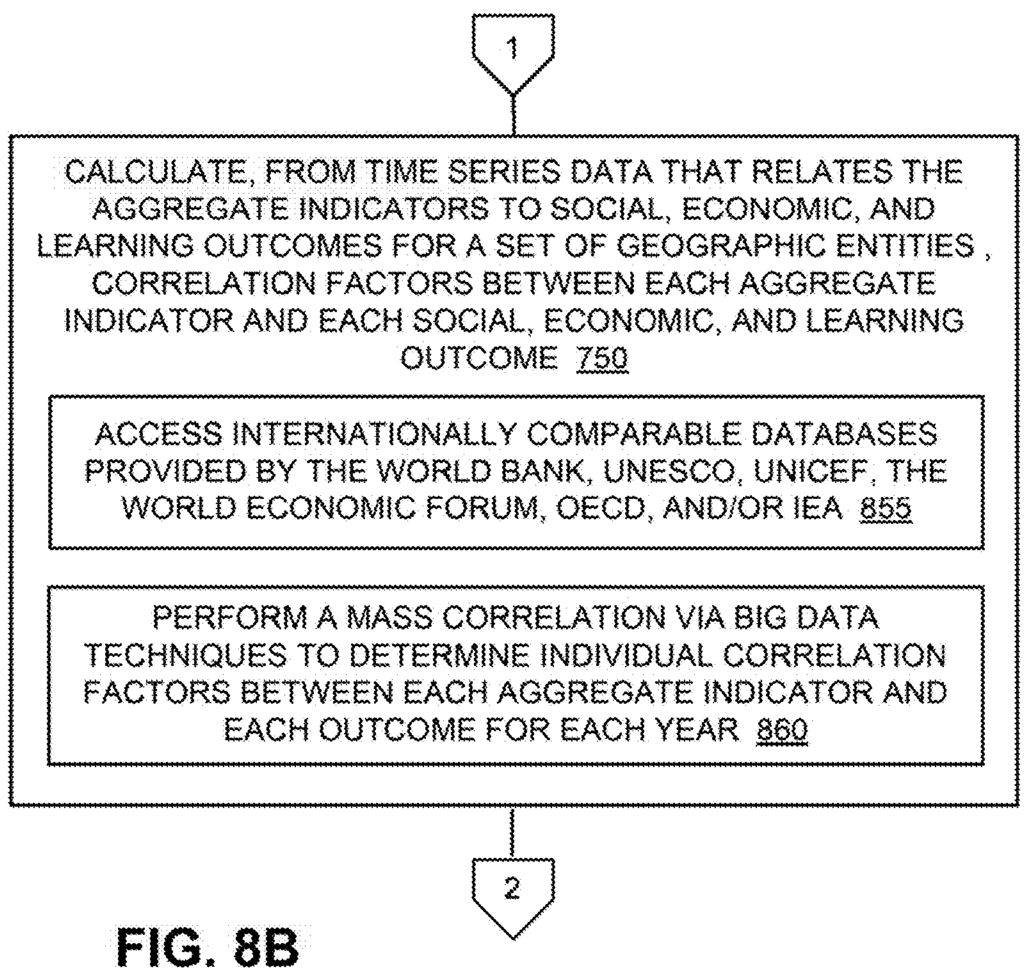

Considering now another method for predicting social economic, and learning outcomes for a geographic entity at a future time, and with further reference to FIGS. 8A-8C, an example method 800 includes the receiving of student data indicators 710, the aggregating of indicators 730, the calculating of correlation factors 750, and the predicting of outcomes 770.

In some examples, the receiving of student data indicators 710 includes automatically providing 815 the student data indicators in near-real-time from computers that are each associated with one of the students in the geographic entity. In some cases, at least some of the student data indicators may include, at 818, a mobility indicator indicative of geolocation of the assigned computer, a configuration indicator indicative of a configuration of the assigned computer, or a usage indicator indicative of student interactivity with the assigned computer. In some examples, the receiving of student data indicators 710 includes receiving 825 additional student data indicators indicative of at least one of demography, attendance, behavior, or academic performance for each of the plurality of students. In some cases, the additional indicators may include at 828, internationally comparable assessment data for the geographic entity.

In some examples, the calculating of correlation factors 750 may include, at 855, accessing one or more internationally comparable datasets provided by at least one of the World Bank, Unesco, Unicef, the World Economic Forum, the Organization of Economic Cooperation and Development (OECD), or the International Educational Assessment organization (IEA), in order to obtain the time series data. In some examples, where the time series data comprises data for each of a set of individual years, the calculating of correlation factors 750 may include, at 860, performing, using the data for each year, a mass correlation in order to determine individual correlation factors between each aggregate indicator and each outcome for each year. The mass correlation may be performed using big data techniques.

In some examples, where the time series data comprises data for each of a set of individual years, the predicting of outcomes 770 includes determining at 872 how the correlation factor for each aggregate indicator and outcome pair changes over the set of individual years; projecting, for each aggregate indicator and outcome pair, at 874 the correlation factor at the future time; and using at 876 the projected correlation factors to predict the outcomes at the future time. Each predicted outcome may include a standard error cone that specifies an uncertainty of that outcome that may be determined at 878.

The method 800 further includes, at 880, presenting at least one of the predicted outcomes to a user via an interactive dashboard that allows the user to modify at least one aggregate indicator and observe a corresponding effect of the modification on the at least one outcome. In some examples, this may include, at 885, selecting at least one of the outcomes; modifying at least one aggregate indicator; and performing a monte carlo simulation to determine a modified outcome, corresponding to each selected outcome, for the geographic entity at the future time based on the correlation factors and the at least one modified aggregate indicator. At 890, the method 800 repeats the aggregating 730, calculating 750, and predicting 770 in response to receiving 710 new near-real-time student data indicators for at least one of the students.

Considering now the operation of the present disclosure in greater detail, and with reference to FIGS. 7 and 9A-9D, consider for simplicity of illustration an example with a single indicator (Youth Literacy), a single desired outcome (GDP Per Capita), and a single internationally comparable database (the WDI dataset) having the time series data. The WDI dataset includes two data subsets used in the example: Youth Literacy (denoted SE.ADT.1524.LT.ZS), and GDP Per Capita (denoted NY.GDP.PCAP.KD, which provides data in constant 2005 U.S. currency). Operation is explained with reference to the blocks of FIG. 7.

With reference to blocks 710 and 730, FIG. 9A illustrates example Youth Literacy for a geographic entity. In this case, the entity corresponds to the entire school system of the geographic entity. The example school system includes twelve student cohorts (i.g. groups), each of which represents an individual school, labeled 1 through 12. Each student in each school who has an assigned computer has taken a literacy assessment (i.e. test) using an application (app) that executes on his or her computer. The student logs into the literacy application with unique, identifiable credentials, and takes the assessment within the application. When completed, the app automatically exports, in near-real-time, the students performance on the literacy assessment, including whether the student passed or failed the assessment. For example, in cohort 1, there were 432 students who passed the assessment, while 394 failed. The results for all twelve schools are aggregated to form an aggregate indicator for Youth Literacy for the geographic entity. In this case, 5870 out of 11,392 students passed the assessment, for an aggregate Youth Literacy rate based on the app of 51.52%.

With reference to block 750. FIG. 98 illustrates example time series data 910 that relates Youth Literacy to GDP Per Capita for a set of peer entities. This time series data is imported from the WDI international dataset. The example time series data exists from 1990 until the current year, which in this example is the year 2010. In addition, the time series data may represent all countries, or a subset of countries. In this case, the time series data represents appropriate categorical peer countries, which in this example constitute heavily indebted poor countries. Categorical peer countries are ones with similar demographic and economic compositions. The time series data may be calculated as the arithmetic mean of individual country data for all the various countries in the subset. Furthermore, the Youth Literacy indicator generated from the app assessments is comparable to the Youth Literacy data in the WDI dataset.

A correlation factor is calculated between each aggregate indicator and each social, economic, and learning outcome. In this simplified example, Youth Literacy is correlated with GDP Per Capita in scatter diagram 915. The time series correlative slope ($R^2$) between them is calculated as $R^2$=0.8573.

Figure 9B:
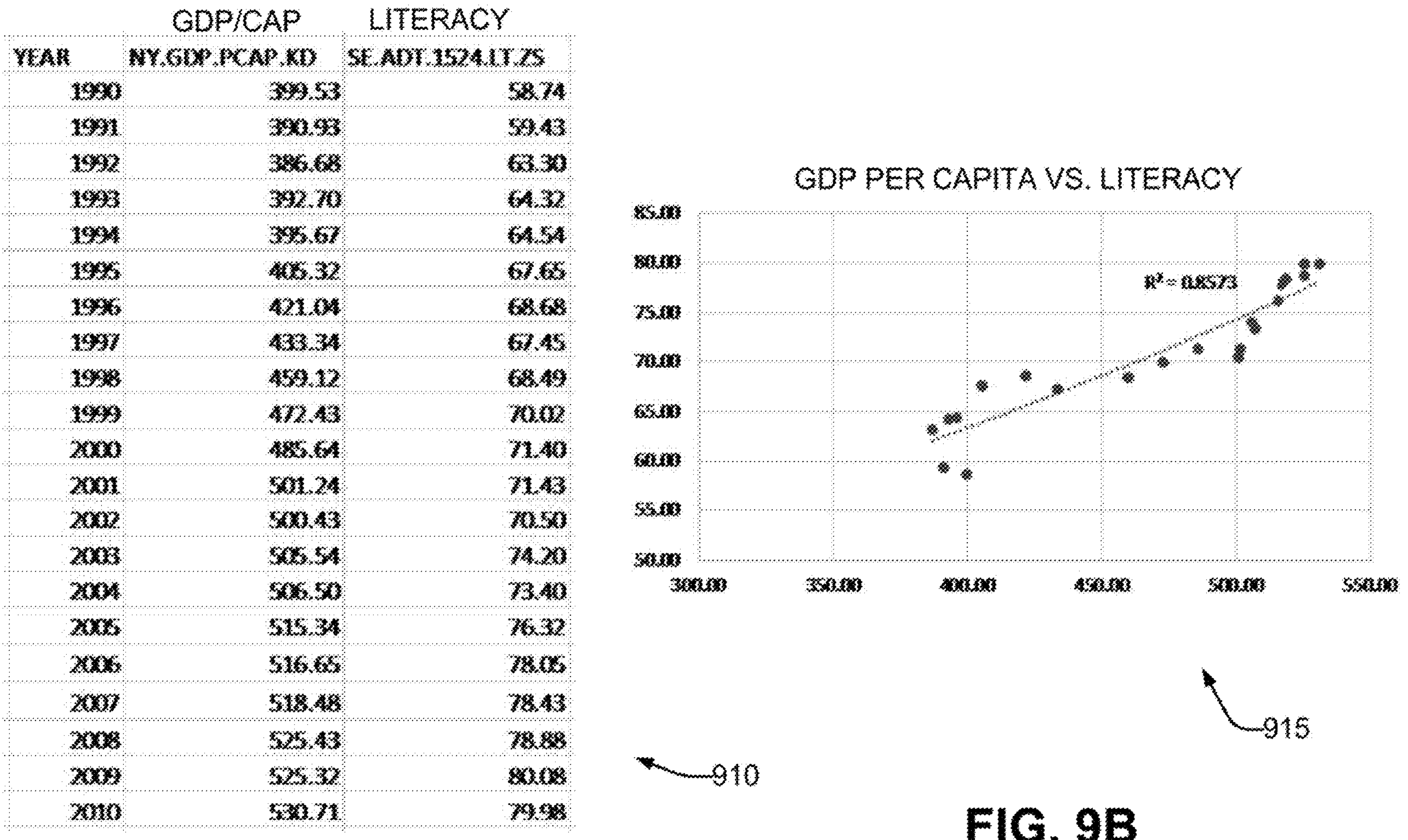
Figure 9C:
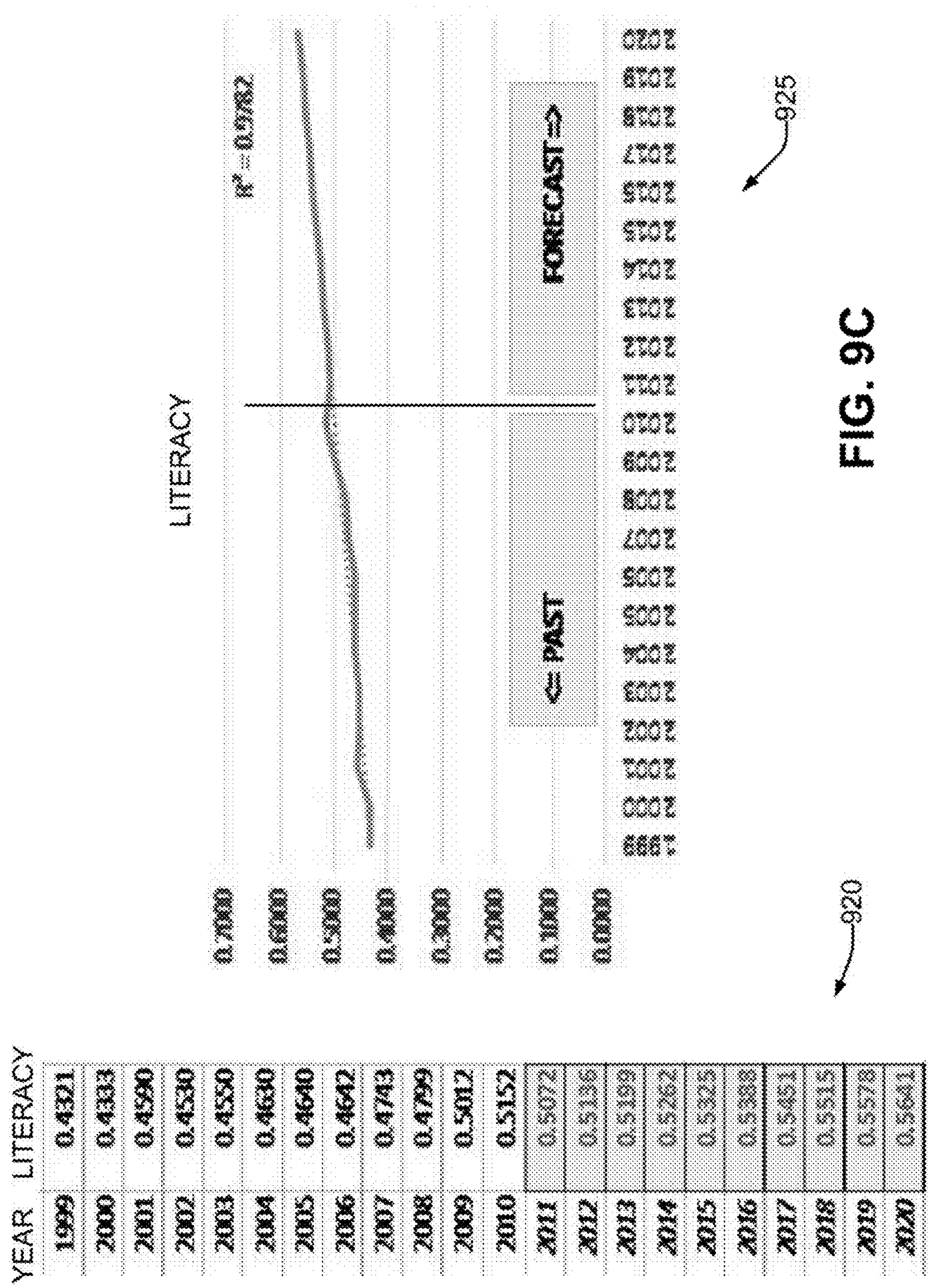

With reference to block 770, the future outcome is predicted using the aggregate indicators and the correlation factors. The future outcome is also predicted using historical time series data for the geographic entity for the aggregate indicators and outcomes. FIG. 9C illustrates a prediction for the aggregate indicator, Youth Literacy, at a future time. In this example, the future time is ten years from the present (i.e. in 2020). The near-real-time performance (i.e. in 2010) on the aggregate Youth Literacy indicator is 51.52%, as discussed. Block 920 shows the historical Youth Literacy indicators for 1999 through 2009. Linear regression is used to forecast the future performance of Youth Literacy in 2020. For example, as shown in graph 925, the correlative slope between time and literacy is calculated as $R^2$=0.9782. Based on this relationship, Youth Literacy is forecasted to rise to 56.41% in 2020. This allows the difference (increase or decrease) between the current near-real-time performance, and the forecasted 2020 performance, to be calculated as 56.41%−51.52%=4.89%.

Figure 9D:
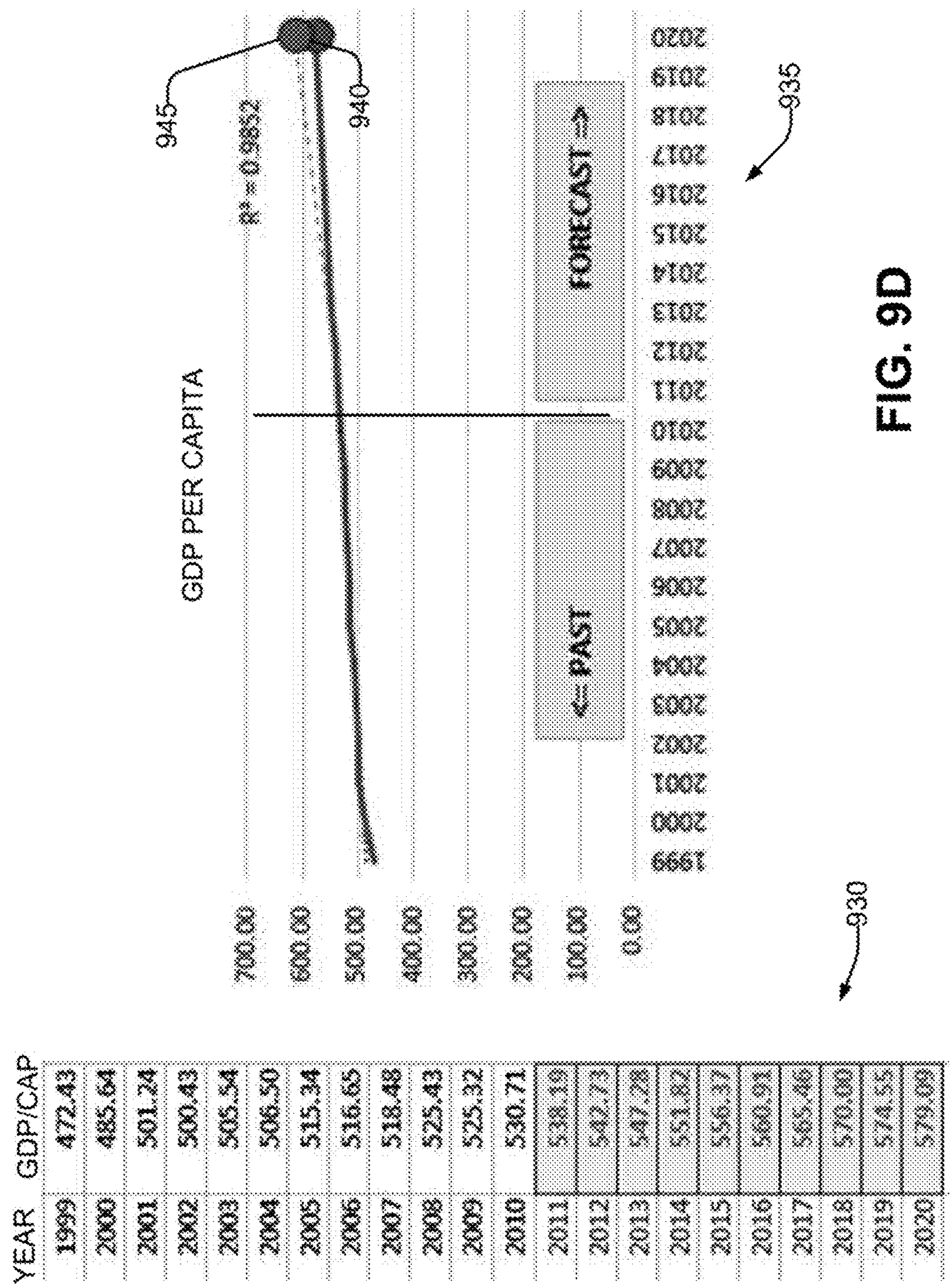

FIG. 9D illustrates a prediction for the outcome of interest, GDP Per Capital, at the future time. Block 930 shows the historical GDP Per Capita outcomes for 1999 through 2010 (this assumes that the 2010 data is already known; if not known for this or other recent years, it can be forecasted). Linear regression is used to forecast the future performance of GDP Per Capita in 2020. For example, as shown in graph 935, the correlative slope between time and literacy is calculated as $R^2$=0.9852. Based on this relationship, GDP Per Capita is forecasted to rise to $579.09 in 2020 at position 940. The large dot represents an error cone for the predicted value.

However, this forecast does not take into account the change in Youth Literacy that is forecast to occur over that 10 year period. As has been discussed, a 4.89% increase in Youth Literacy is projected from 2010 to 2020, and Youth Literacy has a $R^2$=0.8573 correlation with GDP Per Capita. Multiplying the 4.89% forecast increase in the indicator (Youth Literacy) over the period by the factor of 0.8573 which correlates Youth Literacy to GDP Per Capita results in a predicted change of +4.192% in GDP Per Capita due to the change in Youth Literacy. Applying this change to the 2020 forecast for GDP Per Capita yields a revised $579.09*1.0492=$603.37 projection of GDP Per Capita in 2020 at position 945. As before the large dot represents an error cone for the predicted value.

While a simple example has been illustrated in FIGS. 9A-D, it is noted that the technique may be applied to each combinatorial pair of multiple indicators and multiple outcomes. The error cone may be calculated for each prediction, for example using Pearson's confidence interval or other techniques. A re-prediction may be performed in response to the reception of new indicator data, allowing the predictions to be updated in near-real-time. When presented on a dashboard, this provides a powerful tool to understanding the performance of the geographic entity's educational system "right now", and to get fast assessments of the impact of interventions. In addition, the effect of potential changes in one or more indicators on the performance of the educational system can be explored via monte carlo scenarios that simulate modified outcomes.

From the foregoing it will be appreciated that the server, dashboard, and methods provided by the present disclosure represent a significant advance in the art. Although several specific examples have been described and illustrated, the disclosure is not limited to the specific methods, forms, or arrangements of parts so described and illustrated. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Unless otherwise specified, steps of a method claim need not be performed in the order specified. Similarly, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the disclosed examples. Further, methods or steps discussed within different figures can be added to or exchanged with methods or steps in other figures. Further yet, specific numerical data values (such as specific quantities, numbers, categories, etc.) or other specific information should be interpreted as illustrative for discussing the examples. Such specific information is not provided to limit examples. The disclosure is not limited to the above-described implementations, but instead is defined by the appended claims in light of their full scope of equivalents. Where the claims recite "a" or "a first" element of the equivalent thereof, such claims should be understood to Include incorporation of one or more such elements, neither requiring nor excluding two or more such elements. Where the claims recite "having", the term should be understood to mean "comprising".

What is claimed is:

1. A processor-implemented method for predicting social, economic, and learning outcomes for a geographic entity at a future time, comprising:

receiving at a server student data indicators for each of a plurality of students, the indicators provided in near-real-time from each of a corresponding plurality of student computers;

aggregating each indicator for the plurality of students to form a corresponding aggregate indicator;

calculating at the server, from time series data that relates the aggregate indicators to social, economic, and learning outcomes for a set of peer entities, correlation factors between each aggregate indicator and each social, economic, and learning outcome;

predicting at the server, using the correlation factors and the aggregate indicators, the social, economic, and learning outcomes for the geographic entity at the future time; and evaluating at the server an effect on at least one of the predicted outcomes that would result at the future time if at least one of the aggregate indicators is modified from an actual value to a different simulated value, wherein the effect is generated by at least one monte carlo simulation that uses the modified aggregate indicators.

2. The method of claim 1, wherein the evaluating comprises:

selecting at least one of the outcomes;

modifying at least one aggregate indicator; and performing a monte carlo simulation to determine a modified outcome, corresponding to each selected outcome, for the geographic entity at the future time based on the correlation factors and the at least one modified aggregate indicator.

3. The method of claim 1, comprising:

presenting at least one of the predicted outcomes to a user via an interactive dashboard that allows the user to modify at least one aggregate indicator and observe a corresponding effect of the modification on the at least one outcome.

4. The method of claim 1, comprising:

accessing a plurality of internationally comparable datasets provided by at least one of the World Bank, Unesco, Unicef, the World Economic Forum, the Organization of Economic Cooperation and Development (OECD), and the International Educational Assessment organization (IEA), to obtain the time series data.

5. The method of claim 1, wherein the correlation factors are overall correlation factors, wherein the time series data comprises data for each of a set of individual years, and wherein the calculating comprises:

performing, using the data for each year, a mass correlation to determine individual correlation factors between each aggregate indicator and each outcome for each year; and for each aggregate indicator and outcome pair, generating from the individual correlation factors for that pair an overall correlation factor for that pair.

6. The method of claim 1, wherein the time series data comprises data for each of a set of individual years, and wherein the predicting comprises:

determining how the correlation factor for each aggregate indicator and outcome pair changes over the set of individual years;

projecting, for each aggregate indicator and outcome pair, the correlation factor at the future time; and using the projected correlation factors to predict the outcomes at the future time.

7. The method of claim 1, wherein the receiving comprises:

receiving the student data indicators from a plurality of computers each associated with one of the plurality of students, wherein the plurality of students includes all students in the geographic entity who have an assigned computer and wherein each computer automatically provides the indicators in near-real-time.

8. The method of claim 7, wherein at least some of the student data indicators comprise a mobility indicator indicative of geolocation of the assigned computer, a configuration indicator indicative of a configuration of the assigned computer, and a usage indicator indicative of student interactivity with the assigned computer.

9. The method of claim 1, wherein the receiving includes receiving additional student data indicators indicative of at least one of demography, attendance, behavior, and academic performance for each of the plurality of students, and wherein the aggregating includes aggregating each additional student data indicator for the plurality of students to form a corresponding aggregate indicator.

10. The method of claim 1, further comprising:

repeating the aggregating, calculating, and predicting in response to receiving new near-real-time student data indicators for at least one of the students.

11. A server, comprising:

an acquisition module to receive, from a plurality of student computers of a particular geographic entity in near-real-time, student data indicators generated by the plurality of student computers;

an access module to obtain from a database external to the server and the student computers time series data that relates the indicators to social, economic, and learning outcomes for peer entities; and a predictive correlator coupled to the acquisition and access modules to aggregate the indicators for the plurality of students, correlate each aggregate indicator with each social, economic, and learning outcome, predict the social, economic, and learning outcomes for the particular geographic entity at the future time based upon the aggregate indicators and the correlations, and evaluate an effect on at least one of the predicted outcomes that would result if at least one of the aggregate indicators is modified from an actual value to a different simulated value, wherein the effect is generated by at least one monte carlo simulation that uses the modified aggregate indicators.

12. The server of claim 11, comprising:

a visualization module to generate an interactive dashboard, displayable on a client computer coupled to the server, of at least some of the predicted social, economic, and learning outcomes for the particular geographic entity at the future time to a user.

13. The server of claim 11, comprising:

a monte carlo simulator coupled to the predictive correlator to receive from a client computer a modification to at least one aggregate indicator and to predict in response at least one modified outcome for the particular geographic entity at the future time based on the at least one modified aggregate indicator.

14. The server of claim 11, wherein the acquisition module obtains the near-real-time student data indicators from an indicator store, coupled to the server, that receives the indicators from the plurality of student computers.

15. A user interface dashboard displayable by a computer, comprising:

a plurality of outcome components to display predicted social, economic, and learning outcomes, received from a server, for a particular geographic entity at a future time, each outcome determined from near-real-time student data indicators acquired from a plurality of student computers, and from time series data for a set of peer entities that relates the indicators in aggregated form to the outcomes;

at least one control component to user-modify a corresponding indicator in aggregate form from an actual value to a different simulated value; and at least one modified outcome component to display a social, economic, or learning outcome at the future time as modified responsive to the at least one control component, the modified outcome generated at the server by at least one monte carlo simulation that uses the modified indicator in aggregate form.

* * * * *